(12) United States Patent
Urbach

(10) Patent No.: US 12,294,530 B2
(45) Date of Patent: May 6, 2025

(54) TOKEN-BASED BILLING MODEL FOR SERVER-SIDE RENDERING SERVICE

(71) Applicant: OTOY, INC., Los Angeles, CA (US)

(72) Inventor: Julian Michael Urbach, Los Angeles, CA (US)

(73) Assignee: OTOY INC., Los Angeles, CA (US)

( * ) Notice: Subject to any disclaimer, the term of this patent is extended or adjusted under 35 U.S.C. 154(b) by 0 days.

(21) Appl. No.: 18/538,332

(22) Filed: Dec. 13, 2023

(65) Prior Publication Data

US 2024/0113988 A1 Apr. 4, 2024

Related U.S. Application Data

(63) Continuation of application No. 16/740,715, filed on Jan. 13, 2020, now Pat. No. 11,882,056, which is a continuation of application No. 14/930,113, filed on Nov. 2, 2015, now Pat. No. 10,536,395, which is a
(Continued)

(51) Int. Cl.

| | |
|---|---|
| *H04L 47/80* | (2022.01) |
| *G06F 21/10* | (2013.01) |
| *H04L 9/40* | (2022.01) |
| *H04L 12/14* | (2006.01) |
| *H04L 47/12* | (2022.01) |
| *H04L 65/1066* | (2022.01) |
| *H04L 67/131* | (2022.01) |
| *H04L 43/0817* | (2022.01) |
| *H04L 43/0882* | (2022.01) |

(Continued)

(52) U.S. Cl.
CPC .............. *H04L 47/80* (2013.01); *G06F 21/10* (2013.01); *H04L 12/1417* (2013.01); *H04L 12/1439* (2013.01); *H04L 47/12* (2013.01); *H04L 63/10* (2013.01); *H04L 65/1066* (2013.01); *H04L 67/131* (2022.05); *G06F 21/105* (2013.01); *H04L 43/0817* (2013.01); *H04L 43/0882* (2013.01); *H04L 43/16* (2013.01); *H04L 63/08* (2013.01); *H04M 15/00* (2013.01)

(58) Field of Classification Search
CPC ....... H04L 47/80; H04L 47/781; H04L 47/12; H04L 67/131; H04L 67/10; H04L 63/10; H04L 63/08; H04L 12/1417; H04L 12/1439; H04L 43/0882; H04L 43/16; H04L 43/0817; H04L 65/1066; G06F 21/10; G06F 21/105; H04M 15/00
See application file for complete search history.

(56) References Cited

U.S. PATENT DOCUMENTS

| | | |
|---|---|---|
| 6,983,479 B1 | 1/2006 | Salas et al. |
| 8,554,681 B1 | 10/2013 | Wieder |
| 8,972,726 B1 | 3/2015 | Poling |

(Continued)

*Primary Examiner* — Jungwon Chang
(74) *Attorney, Agent, or Firm* — James J. DeCarlo; Greenberg Traurig, LLP

(57) ABSTRACT

A token-based billing model for delivering server-side rendered applications to remote users. A token represents a right to access a server-side rendered application. Each remote user is associated with one or more tokens. When a given token expires, the set of tokens associated with a user is decremented. The rate at which tokens expire are modulated based on aggregate load across the resources of the server-side rendered application provider, as well as the individual loads attributable to each of the users.

20 Claims, 3 Drawing Sheets

Related U.S. Application Data continuation of application No. 12/964,153, filed on Dec. 9, 2010, now Pat. No. 9,197,642.

(60) Provisional application No. 61/285,283, filed on Dec. 10, 2009.

(51) Int. Cl.
*H04L 43/16* (2022.01)
*H04M 15/00* (2006.01)

(56) References Cited

U.S. PATENT DOCUMENTS

| | | | |
|---|---|---|---|
| 9,197,642 B1 | 11/2015 | Urbach | |
| 2002/0002538 A1* | 1/2002 | Ling | G06Q 30/0226 705/26.1 |
| 2002/0161908 A1 | 10/2002 | Benitez et al. | |
| 2003/0200465 A1 | 10/2003 | Bhat et al. | |
| 2004/0037306 A1* | 2/2004 | Khan | H04L 47/781 370/437 |
| 2005/0114530 A1 | 5/2005 | Mangalik et al. | |
| 2007/0005504 A1 | 1/2007 | Chen et al. | |
| 2007/0026942 A1 | 2/2007 | Kinsley et al. | |
| 2008/0083025 A1* | 4/2008 | Meijer | H04L 63/0807 726/9 |
| 2008/0159318 A1 | 7/2008 | Pierlot et al. | |
| 2008/0234047 A1* | 9/2008 | Nguyen | G07F 17/3234 463/42 |
| 2008/0235141 A1* | 9/2008 | Hilerio | G06F 21/105 705/59 |
| 2009/0327450 A1* | 12/2009 | Alkove | H04L 67/10 709/217 |
| 2010/0010915 A1* | 1/2010 | Shea | G06Q 20/06 705/26.1 |
| 2010/0076900 A1 | 3/2010 | Roach et al. | |
| 2010/0146442 A1 | 6/2010 | Nagasaka et al. | |
| 2010/0208614 A1 | 8/2010 | Harmato | |
| 2010/0235284 A1 | 9/2010 | Moore | |
| 2010/0274910 A1 | 10/2010 | Ghanaie-Sichanie et al. | |
| 2011/0093371 A1* | 4/2011 | Clemm | G06Q 30/0207 707/E17.014 |
| 2011/0296521 A1 | 12/2011 | Bernabeu | |
| 2012/0185593 A1 | 7/2012 | Zhu et al. | |

\* cited by examiner

TOKEN-BASED BILLING MODEL FOR SERVER-SIDE RENDERING SERVICE

CROSS REFERENCE TO RELATED APPLICATION

This application is a continuation of and claims priority to co-pending U.S. patent application Ser. No. 16/740,715, filed Jan. 13, 2020, entitled "TOKEN-BASED BILLING MODEL FOR SERVER-SIDE RENDERING SERVICE" which claims priority to U.S. patent application Ser. No. 14/930,113, filed Nov. 2, 2015, entitled "TOKEN-BASED BILLING MODEL FOR SERVER-SIDE RENDERING SERVICE" which claims priority to U.S. patent application Ser. No. 12/964,153, filed Dec. 9, 2010, entitled "TOKEN-BASED BILLING MODEL FOR SERVER-SIDE RENDERING SERVICE", which itself claims priority to Prov. U.S. Pat. App. Ser. No. 61/285,283, filed Dec. 10, 2009, entitled "TOKEN-BASED BILLING MODEL FOR SERVER-SIDE RENDERING SERVICE", all of which are incorporated herein by reference in their entireties, for all purposes.

TECHNICAL FIELD

The present disclosure generally relates to server-side rendered application services and, more particularly, to a token-based billing model and system for the delivery of server-side rendered applications, such as video games, office or productivity applications, and the like.

BACKGROUND

Server-side rendering generally refers to the concept of processing and rendering computer graphics, e.g. video sequences, digital images or text, on computer servers and delivering the resulting graphical output to remote users at their client devices. In one form, the graphical output is delivered as a series of video frames compressed using a video codec. One of the popular applications for server-side rendering is computer games, which often place high demands on the graphical resources of the computer systems used for game execution. Instead of forcing a game player to choose between investing a great deal of money on a high-end computer system capable of satisfying the demands placed on the graphical resources by sophisticated computer games and accepting lower quality graphics, sever-side rendering provides an alternative solution. A game player may choose to have a computer game rendered on a server system, which often contains better resources, and delivered to a remote client device as a video sequence usually compressed using a negotiated video codec. In this case, the client device only needs to decompress and display the processed and rendered images.

Of course, computer games are not the only applications for which server-side rendering is suitable. For example, with video streaming, individual frames of a video may be decoded and rendered on a server system and delivered to the client devices. Similarly, videos and images are not the only types of visual results that may be rendered on a server system. In fact, server-side rendering may be used to render any type of application. For example, text-based applications, such as word processors and spreadsheets, may be rendered on a computer server and delivered to the client devices as well, since, similar to digital images, since the output of such applications is represented as pixels on the display systems.

SUMMARY

The present disclosure generally relates to server-side rendered application services and, more particularly, to a token-based billing model for delivering server-side rendered applications to remote users.

In particular embodiments, a token represents a right to access a server-side rendered application. Each remote user is associated with one or more tokens. When a given token expires, the set of tokens associated with a user is decremented. When all tokens are exhausted, a given user must acquire more tokens for access to the server-side rendered application. The rate at which tokens expire, in one implementation, can initially be set to a base expiration rate, and then modulated based on aggregate load across the resources of the server-side rendered application provider, as well as the individual loads attributable to each of the users.

These and other features, aspects, and advantages of the disclosure are described in more detail below in the detailed description and in conjunction with the following figures.

BRIEF DESCRIPTION OF THE DRAWINGS

The present disclosure is illustrated by way of example, and not by way of limitation, in the figures of the accompanying drawings and in which like reference numerals refer to similar elements and in which.

DETAILED DESCRIPTION OF EXAMPLE EMBODIMENTS

Figure 1:
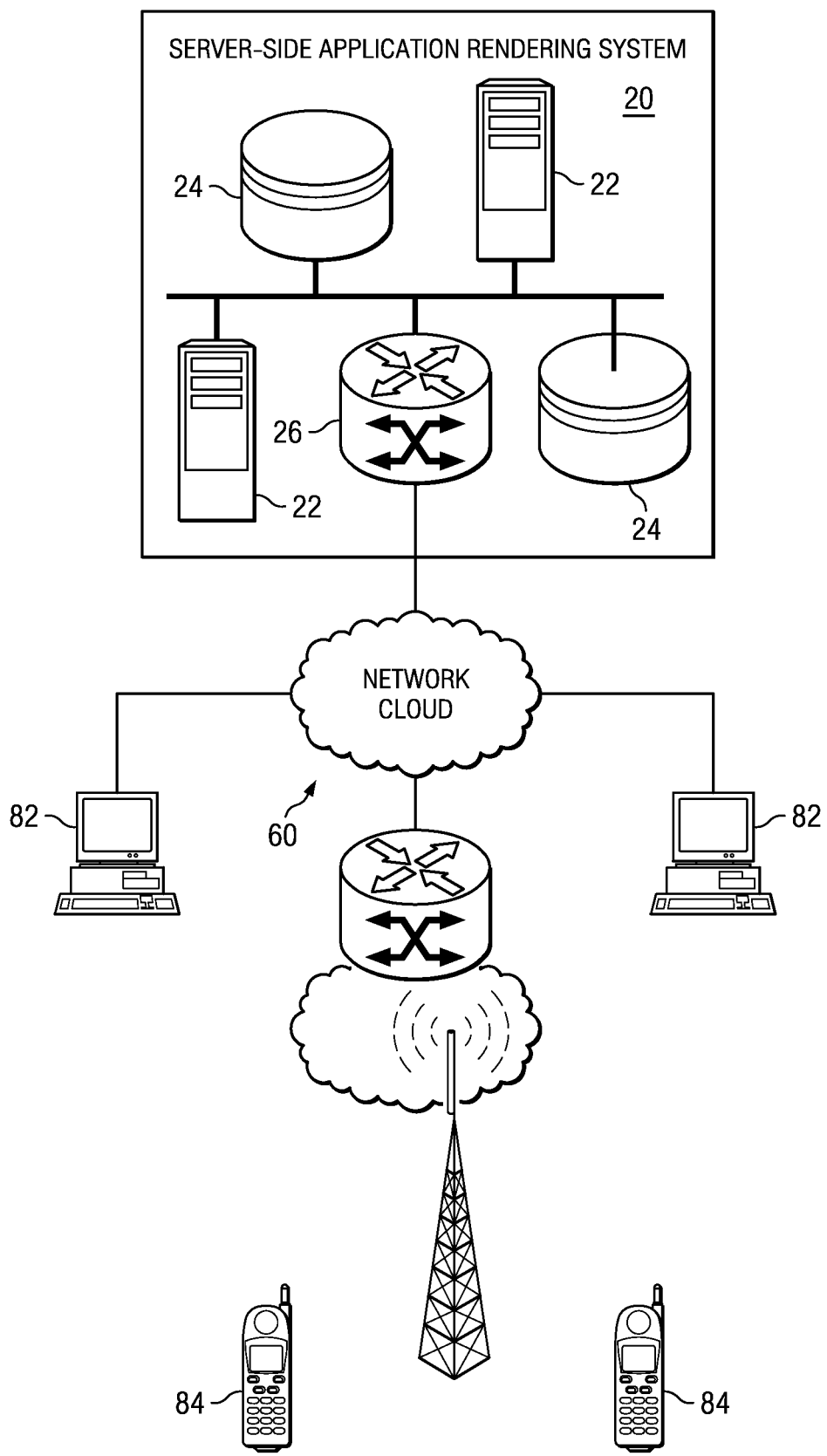
FIG. 1 illustrates an example system for providing and charging for server-side rendering services.

The present disclosure is now described in detail with reference to a few example embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order to not unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

OVERVIEW

In particular embodiments, a server-side application rendering system delivers, utilizing one or more servers, a server-side rendered application to one or more remote users. Each of the remote users is associated with a set of tokens, where each token represents a right to access the server-side rendered application. The server-side application rendering system modulates a rate at which tokens expire based on load observed at the one or more servers caused by delivering the server-side rendered application. In some implementations, the server-side application rendering system may evaluate the individual load associated with delivering the server-side rendered application to each remote user. Still further, the server-side application rendering system may support user interface controls that allow a remote user to adjust at least one session quality parameter that affects the relative load associated with delivering the server-side rendered application to the remote user, therefore adjusting the rate at which tokens expire.

The load associated with delivering a rendered application to a remote user can be assessed based on both the computing and graphics resources required to host the application, render the application output, and/or the bandwidth that is consumed to transmit the rendered output to the remote user. In particular embodiments, the first set of factors that relate to the load attributable to executing and rendering of the application may include, but is not limited to, the quality of the image, the number of pixels contained in the image, the processing operations performed on the image including three-dimensional (3D) and two-dimensional (2D) graphics operations, the amount of rendering done for the images, the amount of resources used for rendering the image, the time the rendering of the image is performed, etc. In particular embodiments, the second set of factors that relate to the load associated with delivering the rendered output may include, but is not limited to, the bandwidth and latency of the transmission, the compression ratio, the encryption applied to the image, etc.

Server-Side Rendering

FIG. 1 illustrates an example network environment in which particular implementations of the invention may operate. As FIG. 1 illustrates, particular implementations of the invention may operate in a network environment comprising a video transmission system 20 that is operatively coupled to a network cloud 60, which may include the Internet. Network cloud 60 generally represents one or more interconnected networks, over which the systems and hosts described herein can communicate. Network cloud 60 may include packet-based wide area networks (such as the Internet), private networks, wireless networks, satellite networks, cellular networks, paging networks, and the like. Some of the networks in network cloud 60 may be circuit-switched networks. The computer network environment, including network 60 can be a packet-based communications environment, employing TCP/IP protocols (for example), and/or other suitable protocols, and has a plurality of interconnected digital packet transmission stations or routing nodes. Client nodes 82 and 84 are operably connected to the network environment via a network service provider or any other suitable means.

Client nodes 82 and 84 may include personal computers or cell phones, as well as other types of mobile or portable devices such as laptop computers, netbooks, personal digital assistants (PDAs), etc. One or more links couple each client 82, 84 and server-side application rendering system 20 to network 60. In particular embodiments, one or more links each includes one or more wireline, wireless, cellular or optical links. In particular embodiments, one or more links each includes an intranet, an extranet, a virtual private network (VPN), a LAN, a WLAN, a WAN, a MAN, a portion of the Internet, or another link or a combination of two or more such links. The present disclosure contemplates any suitable links coupling clients 82, 84 and server-side application rendering system 20 to network 60.

Server-side application rendering system 20 is a network addressable system that hosts one or more applications accessible to one or more users over a computer network. Server-side application rendering system 20 may include web site and server functionality where users may request and receive identified web pages, video streams, applications and other content over the computer network. In particular implementations, server-side application rendering system 20 comprises one or more physical servers 22 and one or more data stores 24. The one or more physical servers 22 are operably connected to computer network 60 via a router 26. The one or more physical servers 22 host functionality that allows users to browse available content, such as receiving requests from, and transmitting responsive data to, client devices 82, 84. In one implementation, the functionality hosted by the one or more physical servers may include web or HTTP servers, RTSP servers, and the like.

Physical servers 22, as discussed above, host functionality directed to supporting and implementing server-side application rendering system 20. In a particular implementation, the physical servers 22 may host one or more applications (such as a video game, a word processing program, and the like), as well as video rendering, compression and streaming functionality. In one implementation, a data store 24 may store video content such as digital content data objects, application code, data objects, user account information, and media assets. A content data object or a content object, in particular implementations, is an individual item of digital information typically stored or embodied in a data file or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects, object or asset definitions, etc. Structurally, content data store 24 connotes a large class of data storage and management systems. In particular implementations, content data store 24 may be implemented by any suitable physical system including components, such as database servers, mass storage media, media library systems, and the like.

Figure 2:
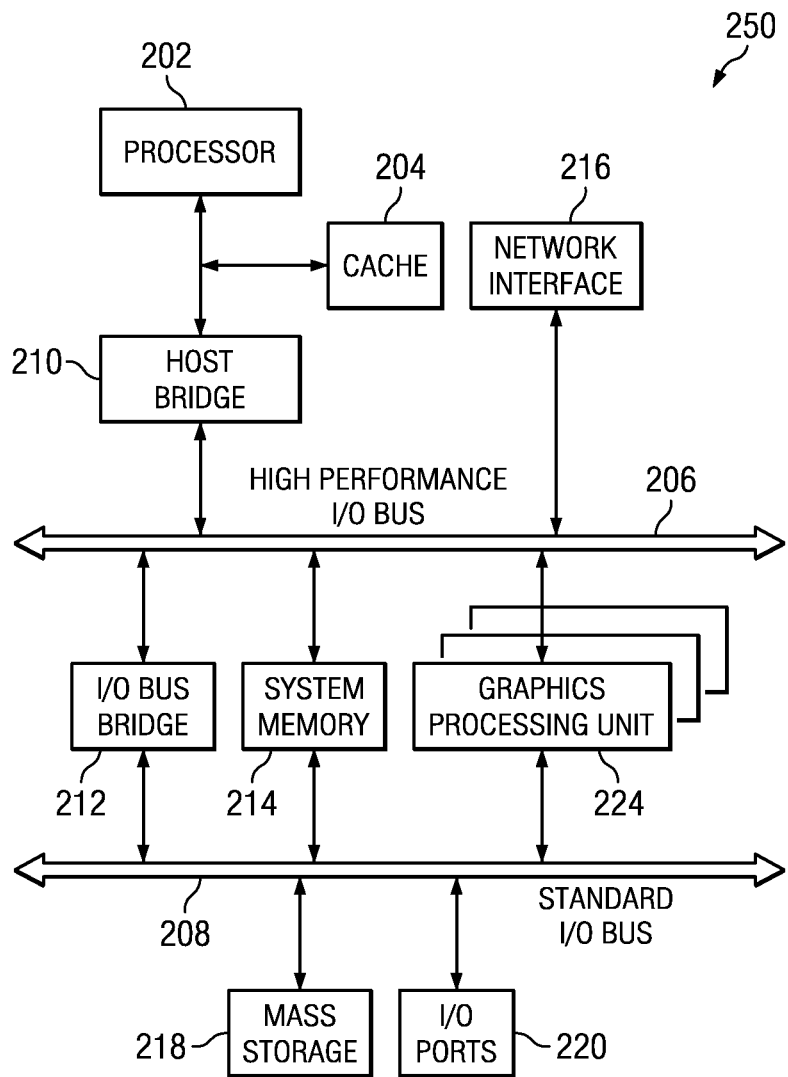
FIG. 2 illustrates an example computer system architecture.

The server and client host systems described herein may be implemented in a wide array of computing systems and architectures. The following describes example computing architectures for didactic, rather than limiting, purposes. FIG. 2 illustrates an example computing system architecture, which may be used to implement a physical server and, in some instances, a client host. In one embodiment, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. For physical servers and clients hosting video compression functionality, hardware system 200 may further include one or more graphics processing units 224 coupled to buses 206 and 208. In one implementation, the graphics processing unit 224 may be embodied in a graphics or display card that attaches to the hardware system architecture via a card slot. In other implementations, the graphics processor unit 224 may be integrated on the motherboard of the server system architecture. Suitable graphics processing units include Advanced Micro Devices®AMD R7XX based GPU devices (Radeon® HD 4XXX), AMD R8XX based GPU devices (Radeon® HD 5XXX), Intel® Larabee based GPU devices (yet to be released), nVidia® 8000 series GPUs, nVidia® 9000 series GPUs, nVidia® GF100 series GPUs, nVidia® 200 series GPUs, and any other DX11-capable GPUs.

Mass storage 218, and I/O ports 220 couple to bus 208. Hardware system 200 may optionally include a keyboard and pointing device, and a display device (not shown) coupled to bus 208. Collectively, these elements are intended to represent a broad category of computer hardware systems, including but not limited to general purpose computer systems based on the x86-compatible processors manufactured by Intel Corporation of Santa Clara, California, and the x86-compatible processors manufactured by Advanced Micro Devices (AMD), Inc., of Sunnyvale, California, as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the location server 22, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain embodiments of the present invention may not require nor include all of the above components. For example, the peripheral devices shown coupled to standard I/O bus 208 may couple to high performance I/O bus 206. In addition, in some embodiments, only a single bus may exist, with the components of hardware system 200 being coupled to the single bus. Furthermore, hardware system 200 may include additional components, such as additional processors, storage devices, or memories.

Graphics processing unit 224, in one implementation, comprises one or more integrated circuits and/or processing cores that are directed to mathematical operations commonly used in graphics rendering. In some implementations, the GPU 224 may use a special graphics unit instruction set, while in other implementations, the GPU may use a CPU-like (e.g. a modified x86) instruction set. Graphics processing unit 224 can implement a number of graphics primitive operations, such as Miffing, texture mapping, pixel shading, frame buffering, and the like. In addition to the 3D hardware, graphics processing unit 224 may include basic 2D acceleration and frame buffer capabilities. In addition, graphics processing unit 224 may support the YUV color space and hardware overlays, as well as MPEG primitives (such as motion compensation and iDCT). Graphics processing unit 224 may be a graphics accelerator, a GPGPU (General Purpose GPU), or any other suitable processing unit.

As discussed below, in one implementation, the operations of one or more of the physical servers described herein are implemented as a series of software routines run by hardware system 200. These software routines comprise a plurality or series of instructions to be executed by a processor in a hardware system, such as processor 202. Initially, the series of instructions may be stored on a storage device or other computer readable medium, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202. The software routines can cause certain operations to be performed by the graphics processing unit 224 and/or the processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Windows® 95/98/NT/XP/Vista/7 operating system, available from Microsoft Corporation of Redmond, Wash. However, the present invention may be used with other suitable operating systems, such as the Apple Macintosh Operating System, available from Apple Computer Inc. of Cupertino, Calif., UNIX operating systems, LINUX operating systems, and the like. Of course, other implementations are possible. For example, the server functionalities described herein may be implemented by a plurality of server blades communicating over a backplane.

In a particular implementation, a server 22 is configured to host one or more applications the rendered output of which is transmitted to remote users over respective user sessions. In one implementation, the server 22 hosts an instance (sometimes called a thread) of a given application for a given user session, generating rendered output utilizing the GPU and transmitting the rendered output as a video stream to the remote user. Therefore, the computing and graphics processing resources of a server 22 may be shared among multiple users. In one implementation, a given server 22 may include multiple GPUs to serve multiple users concurrently. In addition, the resources of a single GPU may be shared among multiple client devices/remote users. In one implementation, the rendered output of an instance of an application comprises a sequence of video frames. These video frames can be streamed to a client 82, 84. In one implementation, a video codec processes video frames buffered in a memory. The memory may be main CPU memory or, in some implementations, the memory buffers available on a GPU. For example, a separate rendering process executing on a GPU (or a CPU) may render the video frame. The example codec may process the frame as described below for output to a video client for decoding and display.

Additionally, video decoding clients may be hosted on the same or similar hardware architectures. For example, client computer 82 may include a GPU which loads encoded video into GPU memory, and decodes the encoded video data to render one or more frames of a video sequence. In other implementations, some or all of the video compression and de-compression operations may also be performed in system memory using a general purpose computing architecture as well.

Token-Based Billing Model

In particular embodiments, a token represents a right to access a server-side rendered application and, more generally, the resources of server-side application rendering system 20. Each remote user is associated with one or more tokens. When a given token expires, the set of tokens associated with a user is decremented. When all tokens are exhausted, a given user must acquire more tokens for access to the server-side application rendering system 20. The rate at which tokens expire, in one implementation, can initially be set to a base expiration rate, and then modulated based on aggregate load across the resources of the server-side rendered application system, as well as the individual loads attributable to each of the users.

A token may be implemented in a variety of manners. In one implementation, a token may be represented as a unit amount associated with a user account, where the number of tokens associated with a user is expressed as a parameter value in a corresponding field of a user account record. In some implementations, a token or set of tokens may be represented as a digital object that has been digitally signed using a cryptographic function, such as SHA and MD5. For example, a token data object may include a message and a message digest. The message may include a variety of fields, such as a user account identifier, an identifier of the token issuing entity, a number of tokens, time stamps, the application types for which the token can be used, and the like. The message digest is a hashed value of the message. The token data object may be stored locally with a given client application (and passed in a browser cookie or other state object) and/or remotely in a remote database. An individual or entity may purchase or otherwise acquire tokens for itself or for transfer to others. For example, a user may purchase a set of tokens in order to access a network application, such as a video game, supported by a server-side application rendering system 20. In some implementations, an entity may acquire tokens from the server-side application rendering system 20 and transfer them to users as part of a promotional or marketing campaign.

In a particular implementation, a token expires at a base expiration rate, entitling a given user to a certain unit amount of access to the computing resources of the server-side application rendering system 20. For example, if the expiration rate does not change from the default rate, a token may allow a user to access the resources of application render farm for a given amount of time, such as 30 minutes. As discussed below, however, the rate at which tokens expire may vary dynamically based on observed loading conditions. Even the base expiration rate may vary depending on the type of access during a given user session. For example, accessing using a mobile device with a smaller screen size typically requires less computing resources—especially GPU resources; therefore, the base rate for the session may be lower relative to the base rate for a session where a user accesses a network application rendered by the application render farm using a personal computer and requests a larger window size, such as the entire display screen (e.g., 1920×1080 pixels) and rendering at full resolution.

In one implementation, the base expiration rate for a given user session may be based on the number of render units allocated to the user session. A render unit, in one implementation, represents a fixed pixel area, such as 256×256 or 128×128 pixels allocated to a given user session. As discussed above, the resources of a server 22 include at least one GPU that includes a render target (a defined memory space, such as a frame buffer) that supports a vast array of pixels. This render target and the remaining facilities of the GPU can be used for one to many user sessions. Accordingly, the render target can be conceptually divided into render units and allocated to different user sessions. The number of render units allocated to a given user session may depend on the type of client device (and corresponding display type), as well as the resolution at which the application is to be rendered. The display systems of client devices, such as laptops, desktops, notebooks and mobile devices can vary considerably. For example, the iPhone® offered by Apple, Inc.® of Cupertino, California has a 3.5-inch (diagonal) display screen with a pixel resolution of 480×320 pixels. Laptops and desktop computers may have considerably larger displays. For example, a desktop computer may have a 21-inch (diagonal) display with a 1920-by-1080 pixel resolution. Accordingly, a user session associated with a desktop client may be allocated enough render units to account for the desired display size. Still further, the greater number of pixels to render requires more bandwidth relative to user sessions with lower number of pixels. In other implementations, the base expiration rate does not depend on the number of render units allocated to a given user session. In such an implementation, the number of render units allocated to a given user session may be another decisional factor in deciding to increase the expiration rate and by how much to increase it.

In some implementations, the base token expiration rate may also be based on financial factors. For examples, assume that two different applications hosted by server-side application rendering system 20 are video games licensed by video game publishers. One video game publisher may require 50 percent of the token revenues received by the entity that operates system 20, while the second video game publisher may require 20 percent of token revenues. The operator of system 20 may set the base expiration rate to a higher value for the video game of the first video game publisher, relative to the second video game publisher to account for the difference in revenue realized by the operator of system 20.

As discussed herein, a token management process may monitor operation of server-side application rendering system 20 relative to one of more of CPU utilization, GPU utilization and bandwidth utilization—both in the aggregate and with respect to individual user sessions. The token management process may also monitor the available resources of system 20 and adjust the expiration rate as servers 22 come on line and go off line. CPU utilization can be accomplished by querying operating system facilities that monitor CPU utilization relative to application processes or threads. Bandwidth utilization may be monitored by servers 22 or a remote device by classifying packets that egress from the servers 22 based on user sessions. GPU utilization may be tracked in a similar manner to CPU utilization; provided that similar monitoring facilities exist. If no such facilities exist, GPU utilization can be estimated based on CPU utilization, session quality settings and application type. In another implementation, GPU utilization can be monitored by implementing a low priority process that, when no other processes are executed, would consume all the resources of a given GPU. When other processes are executed, some of the GPU resources are consumed by such other, higher priority processes. By monitoring the output of this low priority process and comparing it to a baseline output, a GPU load can be determined.

The token management process may increase the token expiration rates for different users as the resources of server-side application rendering system 20 become increasingly taxed. In one particular implementation, for example, server-side application rendering system 20 may expire tokens for all users at a base expiration rate while the aggregate load lies below a threshold—e.g., where the system 20 has more than sufficient resources to service new users and user sessions without comprising the existing user sessions of other users. An example use case may be an off-peak hours scenario, where there are lower numbers of users during unpopular hours. As additional users login to server-side application rendering system 20 and aggregate load crosses a threshold, the token management process may begin to analyze the load attributable to individual user sessions and increase the expiration rate for individual user sessions that exhibit higher load relative to the mean or some other value. The token management process may also increase the expiration rate for all user sessions during peak hours with the amount of the increase depending on the individual load characteristics of respective user sessions.

Figure 3:
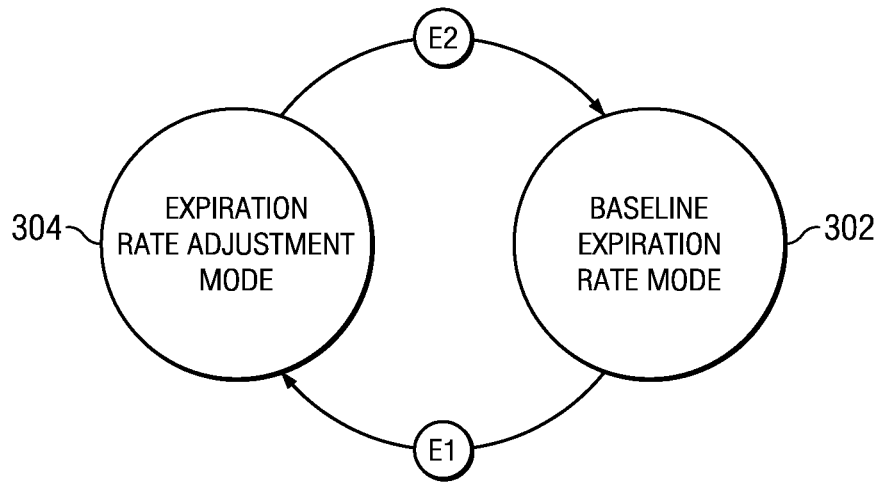
FIG. 3 is a state diagram associated with a token-based billing model for server-side rendered application services.
Figure 4:
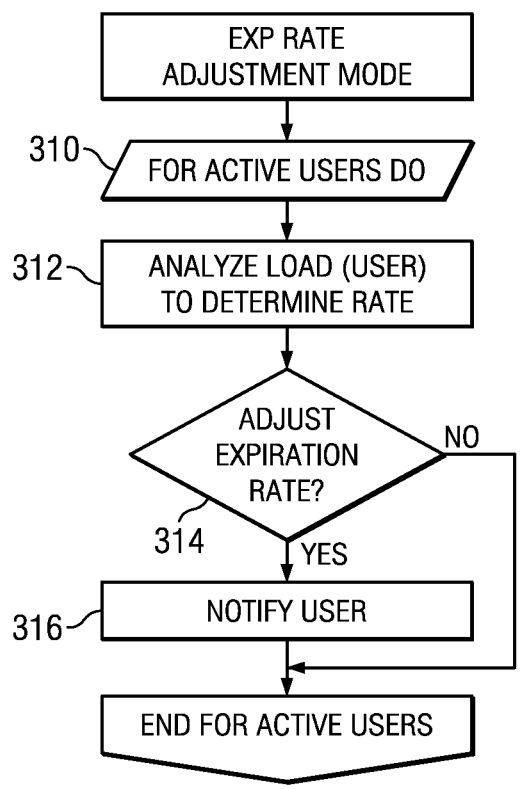
FIG. 4 illustrates an example method for adjusting a token expiration rate for server-side rendering services.

FIGS. 3 and 4 illustrate an example process flow and method for modulating a token expiration rate in a token-based billing model for server-side rendered application services. The operations illustrated in FIGS. 3 and 4 are described with reference to the network environment illustrated in FIG. 1. In one implementation, the expiration of tokens is handled by a process associated with the application instance or user session. A separate token management process may monitor operation of the system 20 and adjust the expiration rates for the user sessions individually or in the aggregate.

FIG. 3 is a state diagram illustrating how server-side application rendering system 20 may transition between a baseline expiration rate mode 302 and an expiration rate adjustment mode 304. As FIG. 3 illustrates, the token management process transitions from the baseline expiration rate mode 302 to the expiration rate adjustment mode 304 in response to an event E1, and transitions from the expiration rate adjustment mode 304 to the baseline expiration rate mode 302 in response to an event E2. Event E1 may be triggered by the observed aggregate load on server-side application rendering system 20 crossing a baseline threshold value, while event E2 may be the observed aggregate load falling below the baseline threshold value. In other implementations, E1 and E2 can be based on temporal considerations—especially for embodiments where a given server-side application rendering system 20 is configured to serve a particular geographic area that may span only a limited number of time zones. For example, E1 and E2 may be triggered in response to time-of-day setting. For example, E1 and E2 may be configured to implement a billing model where tokens expire more quickly during administratively determined peak or premium hours relative to non-peak or non-premium hours. In some implementations, a transition from mode 302 to mode 304 may cause an across-the-board increase in the token expiration of all active user sessions.

FIG. 4 illustrates an example method implemented by a token management process during the expiration rate adjustment mode 304. In this mode 304, the token management process periodically analyzes the load associated with individual user sessions (310, 312) and determines the token expiration rate for a given user session. If token management process determines to increase the token expiration rate for a user session (314), the token management process may cause a notification to be transmitted to the user (316). In one implementation, the user notification may be in the form of a pop-up notification that links to a user settings interface that allows the user to adjust one or more settings that may reduce the load associated with the user's session and therefore decrease the token expiration rate for that user.

The logic that the token management process utilizes to determine the expiration rate for a given user session can vary considerably to achieve a variety of different billing and charging models. The expiration rate determination logic can consider a number of factors, such as time of day, bandwidth utilization, CPU utilization, GPU utilization, and application type. The evaluations of many of these factors can be made in comparison with aggregated values (such as averages and means) across other user sessions and/or to various threshold values. In addition, the determination may include weightings of one or more of the individual factors in a component or multi-factored algorithm for determining the expiration rate. In addition, the application type may be relevant to load considerations, as different applications may have different resource allocation requirements. For example, some video game applications may require larger allocations of CPU resources for execution. In addition, some applications may be more popular than other applications. Accordingly, application type can be used to account for either or both of the resource requirements for a given user session and the popularity of the application which relates to the number of user sessions related to that application. For example, the expiration rate can be set higher for a newly released video game relative to other video games. In some implementations involving rendering point clouds or voxels, the cost and expiration rate can be mapped to the number of intersections of rays to point objects in a scene. This can be applied to games that are entirely or partially ray-traced including graphics rendering and physics operations.

As discussed above, a user, either in response to a notification or generally, may adjust one or more session quality settings that affect the load attributable to a given user session. The session quality settings may include, but are not limited to display settings (such as resolution and screen size), frame rate, video quality (tied to compression settings, for example, such as target bit rate). As discussed above, the user's choice of application type may affect the baseline resources, such as CPU/GPU/RAM resources, required to deliver the application. For example, a user, confronted with a notification of an increase in the token expiration rate, may decide to adjust the resolution or screen size to consume less render units, and/or opt for more aggressive compression to reduce bandwidth consumption. As an additional example, a user may opt to turn off P-frame encoding to receive only I-frames, which lowers the computational load to compress the video sequence, but increases bandwidth usage (which depending on the region may be relative small part of the cost of delivering the service). In addition, the user may allow server-side application rendering system 20 to automatically determine the user's session quality settings to minimize the token expiration rate. Additional settings may include motion blur (e.g., setting this on or off to reduce computational resources required to generate video frames), color or bit depth, as well as other rendering parameters such as ray tracing parameters, lighting quality and shading.

In addition, the user interface that is provided to the user normally without any such notification may include a graphical indicator, such as a status bar, that indicates the number of remaining tokens and/or the amount of time left on the system at the current expiration rate. In addition, the interface may include text or graphics that indicate the current rate of token expiration. In addition, the user interface may allow the user to adjust the session quality controls discussed above, using keyboard, mouse and/or joystick inputs (or be presented with a pop-up dashboard). With the visual indicators of token amount and expiration rate, the system provides the user with visual feedback of the effects of his or her adjustments on the rate of token expiration. For example, a user interface may include on/off controls, slider bars, pull-down menus, and the like corresponding to one or more of the session quality settings discussed above. In addition, the system 20 can be configured to adjust the session quality settings in real-time as the user adjusts the controls so that the user may visually perceive the effect of the adjustments thereby achieving a continuous feedback loop.

In another implementation, the system 20 may allow a user to control token expiration by specifying overall budget parameters. For example, the system 20 may allow a user to specify a token budget (i.e., a maximum number of tokens he or she desires to spend during a session or some other time period) and either a maximum data size transfer budget (the number of bytes of data transfer) or a maximum time budget (the amount of time the user would like the token budget to last). In one implementation, the system 20 also allows the user to indicate other session quality parameters that the user would like to fix, such as screen size, render quality, and the like. The system 20 can compute one or more session quality parameters based on the user settings and the cost considerations described herein. For example, the system 20 can compute an initial maximum bit rate for the session based on the token budget and transfer size or time budget. As the session progresses, the system 20 can periodically modulate the initial bit based on the number of remaining tokens and the remaining time or data transfer budget. The maximum bit rate can be reset based on the historical consumption during the session and the remaining number of tokens. For example, at points where a user has consumed half of its remaining tokens, the system may reset one or more session quality settings.

A variety of factors can be considered when determining an expiration rate—whether the base or dynamically adjusted rate. The cost or load associated with rendered application output provided by system 20 may depend on how the output is to be rendered by the server system, including, for example, the resolution or the size of the image, the quality of the image, the graphical operations to be applied to the image, the amount of rendering to be performed by the server, etc., and user specifications on how the resulting image is to be delivered to the client device, including, for example, the bandwidth for transmitting the image, the compression and encryption to be applied to the image, etc.

In particular embodiments, a video sequence may contain one or more frames, i.e., digital images, and each digital image, in its raw form, is a collection of pixels. A pixel is the smallest item of information in a digital image. Typically, pixels are arranged in a 2D grid, and are represented using dots, squares, or rectangles. When displayed, each pixel in a digital image usually corresponds to a dot on the display screen. The content of the individual digital images may vary greatly. Some images may include graphical objects while other images may include text. In fact, the pixels in a digital image may represent any combination of graphical and textual objects.

The system 20 may determine a token expiration rate based on the cost for rendering and delivering the video sequence based on various factors, including, for example, factors relating to the rendering of the frames of the video sequence and factors relating to delivering the video sequence. In particular embodiments, the token expiration factors may be organized into two categories: those factors relating to the rendering of an image and those factors relating to the delivering of an image by a server system. The factors relating to the rendering of an image by a server system may be collectively referred to as "rendering factors." The factors relating to the delivering of an image by a server system may be collectively referred to as "delivering factors." Thus, the charges, e.g., the token amount and the rate at which the token expires, for providing server-side rendering services may be based on either the rendering factors, or the delivering factors, or a combination of the two categories. Several examples of the rendering factors and the delivering factors are described below. However, the rendering factors and the delivering factors are not limited to the examples provided herewith. In addition, the expiration factors are not limited to only theses two categories of factors.

For example, a sever typically remains in continuous operation even when it is not actively rendering and delivering application output. All electronic devices require power supply while in operation. In addition, hardware tends to wear down after some period of time and software needs to be upgraded periodically. The billing model may take these factors into consideration as well. One factor may be related to the electricity cost of maintaining the server in continuous operation. One factor may be related to the cost of wear and tear, replacing, and upgrading of the hardware. One factor may be related the cost of replacing or upgrading the software.

In particular embodiments, rendering factors relate to the rendering of a video sequence, and more specifically, to the rendering of the individual frames in the video sequence by a server system. Each frame is in fact an image. There are many operations that may be applied during the rendering of an image. The image may be rendered based on the specifications specified by the user requesting the image or originated from the server performing the rendering.

One characteristic of an image is its resolution, which represents the amount of detail the image holds. An image's resolution may be measured in different ways. In particular embodiments, a digital image's resolution is measured by the number of pixels in the image. Higher resolution images have relatively more number of pixels, while lower resolution images have relatively less number of pixels. One rendering factor may be related to the resolution of the resulting image. Higher resolution images often require relatively more processing effort to render and thus may be more expensive, while lower resolution images usually require relatively less processing effort to render and thus may be less expensive. The user requesting the video sequence may specify the resolution of the resulting video frames based on the client device the user uses to display the image. If the client device is capable of displaying high resolution images, the user may be willing to pay the extra amount to have the server render the video frames at a higher resolution. On the other hand, if the client device is only able to display low resolution images, then the user may choose to have the server render the video frames at a lower resolution and save some of the rendering cost.

Some video sequences or images may be compressed or encoded. To efficiently deliver the video sequence, a video code may be used—such as H.264 or some other codec. Thus, to deliver the individual frames of a video may require that the video file be compressed. One rendering factor may be related to the CPU and/or GPU resources for compressing the video sequence. Relatively more complex compression effort may result in higher per-pixel cost, while relatively less complex compression effort may result in lower per-pixel cost. In addition, one cost factor may consider a determination as to whether the same GPU that renders the video can be used to compress the resulting video stream. If so, PCI bus consumption can be significantly reduced. U.S.

application Ser. No. 12/579,300, which is incorporated by reference herein, discloses compression of video streams on GPUs.

Some 2D images may be rendered from 3D graphics, such as in the case of high-end computer games. Ray tracing is a popular technique used to render 2D images from 3D graphics from a particular view point or perspective. The resulting 2D image is generated by tracing the paths of light through pixels in an image plane. In particular embodiments, the quality of the resulting 2D images depends on the number of light paths, i.e., rays, used in the ray tracing process. Since ray tracing is computationally intensive, the number of bounces (the greater number of rays traced for specular and glossy reflections), the more processing resources are required. One rendering factor may be related to the number of rays used in generating the resulting 2D image using ray tracing, with greater number of bounces resulting in higher per-pixel cost and vice versa. In other implementations, a user may select whether path tracing, pure rasterization or direct lighting is used, as such a choice can affect the cost of rendering and the rate at which tokens expire.

Light and shadow are often used to give the illusion of 3D in a 2D image. The number of light sources, the reflections of the light sources from the objects in a scene, and the depth, shape, detail, etc. of the shadow areas all contribute to the quality, e.g., realism, of an image as well as affect the cost of rendering the image. One rendering factor may be related to the number of light sources in a scene represented by the image. One rendering factor may be related to the number and quality of the reflections and tin a scene represented by the image. One rendering factor may be related to the number and quality of the shadow areas in a scene represented by the image. In particular embodiments, greater number of light sources and shadow areas require more processing power and thus result in higher per-pixel cost.

Real objects have textures. To imitate real objects, objects represented in a digital image may also have textured surfaces. The surfaces of the objects may be smooth or rough, shining or dim, etc. One rendering factor may be related to the texture of the objects in a scene represented by the image with more complex texture algorithms resulting in higher per-pixel cost and vice versa.

Anti-aliasing is a technique used in digital image processing to minimize the distortion artifacts known as aliasing. For example, a scene represented by an image may be first created at a resolution much higher, e.g., 4 times, 8 times, or 16 times, of the resulting image to include more details. Then the higher resolution image may be scaled down with anti-aliasing to obtain the final resulting image. In another example, anti-aliasing is frequently applied when representing texts. One rendering factor may be related whether to apply anti-aliasing and how much anti-aliasing is applied when resizing an image during the rendering process. In one implementation, the system 20 allows a user to select from different aliasing modes—including full scene anti-aliasing, edge anti-aliasing, and hardware-based antialising modes—in order to adjust token expiration.

Motion may also be depicted using various techniques. Motion is important to help create certain illusions and effects for animations, games, videos where a sequence of images, i.e., frames, together represent moving event rather than a static scene. To depict motion realistically, physical laws are taken into consideration. For example, gravity, momentum, acceleration, deceleration, etc. all exert different effects on the objects represented in the images. One rendering factor may be related to incorporating various types of physical effects into the rendered images. In particular embodiments, the user may specify the individual rendering techniques to be applied during the rendering process or the quality of the resulting images and is then charged accordingly. For example, the system 20 may allow a user to select or specify a motion blur quality and/or an amount of samples used to compute motion blur.

In a 3D scene, from a particular view point, some objects may be in front of other objects. The object behind another object may be completely or partially obscured by the other object in front of it. When rendering a 3D scene into a 2D image, the 2D image represents the 3D scene from a particular view point. The rendering process needs to determine, with respect to the specific point of view, which object is in the front and which object is at the back. In other words, the objects in the scene are at different layers with respect to the view point. In addition, the rendering process determines how much of the object at the back is obscured by the object in the front. One rendering factor may be related depth queued culling—the layering effect in the scene represented by the rendered image.

For applications such as animations, games, videos, etc., multiple still images together create the illusion of motion. Each still image in a sequence is typically referred to as a frame. There needs to be sufficient number of frames displayed each second to fool the human eyes into seeing moving objects. Typically, videos are displayed at approximately 30 frames per second. High-quality games are displayed at approximately 60 frames per second. The higher the quality, the more frames need to be rendered. One rendering factor may be related the number of frames generated each second. In addition, between two consecutive, there may be minor differences, especially in the background areas. Thus, from one frame to the next, the server may only need to process the differences between the two frames. One rendering factor may be related to the amount of new information the server needs to process for each frame.

It takes resources, e.g., processors, memory, etc., to execute the various applications and graphical operations involved in the rendering of the application output. Moreover, it takes time to perform these application and graphical operations. In other words, it takes time for the server to execute application processes and render each image of a video sequence. In general, the more resources devoted to the executions of the various application operations, the less time it takes to render the image. Some users may need to have their images rendered as quickly as possible, while other users may be willing to experience some lag time. One rendering factor may be related to the amount of resources devoted to the application and rendering process, with relatively more resources resulting in higher cost and vice versa. The individual users may have the option to specify the amount of resources to be used to render the application output. Similarly, one rendering factor may be related to the amount of time or processing cycles taken to render each image, with relatively less time resulting in higher per-pixel cost and vice versa. The individual users may have the option to specify how quickly they wish to receive the resulting images.

Some client devices may have more resources in terms of processor power or memory capacity than others. The users at these client devices may choose to have the server only process the video frames partially and deliver the data that enable their client devices to generate the final resulting images. Instead of paying for the complete rendering of the video frames, these users may wish to only pay for the server to perform certain intermediate operations, such as the highly computational intensive operations. The server delivers the intermediate results as well as any additional data needed to the client devices and the client devices finish the rendering processes based on the intermediate results and additional data received from the server. One rendering factor may be related to the percentage of rendering process to be performed by the server, with higher percentage resulting in higher per-pixel cost and vice versa.

After a server has rendered a video sequence, the video sequence needs to be delivered to a client. In particular embodiments, delivering factors relate to the delivering of a video sequence to a client device by a server system. There are many operations that may be applied during the delivering of a video sequence. Similar to the rendering of the video sequence, the video sequence may be delivered to the client based on the specifications specified by the user requesting the video sequence or originated from the server.

Bandwidth represents the rate at which data are transmitted, and is usually expressed in bits per second. The higher bandwidth is used, the faster the data is transmitted. One delivering factor may be related to the bandwidth used to deliver the resulting video sequence to the client with higher bandwidth resulting in higher per-pixel cost and vice versa. The user may optionally specify the bandwidth used to deliver the images to the user's client device.

Compression techniques may be used to decrease the size of the video data. However, compression requires additional processing. One delivering factor may be related to the percentage of compression to be applied to the resulting video sequence as well as the individual frames in the video sequence before delivering the video sequence to the client. Higher compression ratio generally results in smaller amount of video data but may result in higher per-pixel cost. Lower compression ratio generally results in larger amount of video data but may result in lower per-pixel cost. If the user does not require any compression, then the user is not charged for the compression cost.

Data transmitted over a network may be encrypted to provide security protection. Sometimes, a user may request that the server encrypt the rendered video frames before delivering them to the user's client device. One delivering factor may be related to the encryption of the resulting video sequence. If the user request that the video data be encrypted, then the cost of the encryption is added to the per-pixel cost.

In some implementations, the system 20 may also support an offline token consumption process for non-realtime applications. For example, a user desiring to submit a video rendering job to the system 20 can select an offline rendering option and submit the application and job to the system 20. The system 20 can queue the job and process the application and data to create the video during off-peak periods when resources are available.

The methods described above may be implemented as computer software using computer-readable instructions and physically stored in computer-readable medium. For example, token management process may be implemented as computer software that may be executed on server 22. A "computer-readable medium" as used herein may be any non-transitory medium that can contain, store, communicate, propagate, or transport the program for use by or in connection with the instruction execution system, apparatus, system or device. The computer readable medium may be, by way of example only but not by limitation, an electronic, magnetic, optical, electromagnetic, infrared, or semiconductor system, apparatus, system, device, propagation medium, or computer memory.

The computer software may be encoded using any suitable computer languages, including future programming languages. Different programming techniques can be employed, such as, for example, procedural or object oriented. The software instructions may be executed on various types of computers, including single or multiple processor devices.

Embodiments of the present disclosure may be implemented by using a programmed general purpose digital computer, by using application specific integrated circuits, programmable logic devices, field programmable gate arrays, optical, chemical, biological, quantum or nano-engineered systems, components and mechanisms may be used. In general, the functions of the present disclosure can be achieved by any means as is known in the art. Distributed or networked systems, components and circuits can be used. Communication, or transfer, of data may be wired, wireless, or by any other means.

For example, FIG. 2 illustrates an example computer system 200 suitable for implementing embodiments of the present disclosure. The components shown in FIG. 2 for computer system 200 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system. Computer system 200 may have many physical forms including an integrated circuit, a printed circuit board, a small handheld device (such as a mobile telephone or PDA), a personal computer or a super computer.

A "processor," "process," or "act" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Although the acts, operations or computations disclosed herein may be presented in a specific order, this order may be changed in different embodiments. In addition, the various acts disclosed herein may be repeated one or more times using any suitable order. In some embodiments, multiple acts described as sequential in this disclosure can be performed at the same time. The sequence of operations described herein can be interrupted, suspended, or otherwise controlled by another process, such as an operating system, kernel, etc. The acts can operate in an operating system environment or as stand-alone routines occupying all, or a substantial part, of the system processing.

Reference throughout the present disclosure to "particular embodiment," "example embodiment," "illustrated embodiment," "some embodiments," "various embodiments," "one embodiment," or "an embodiment" means that a particular feature, structure, or characteristic described in connection with the embodiment is included in at least one embodiment of the present disclosure and not necessarily in all embodiments. Thus, respective appearances of the phrases "in a particular embodiment," "in one embodiment," "in some embodiments," or "in various embodiments" in various places throughout this specification are not necessarily referring to the same embodiment. Furthermore, the particular features, structures, or characteristics of any specific embodiment of the present disclosure may be combined in any suitable manner with one or more other embodiments. It is to be understood that other variations and modifications of the embodiments of the present disclosure described and illustrated herein are possible in light of the teachings herein and are to be considered as part of the spirit and scope of the present disclosure.

It will also be appreciated that one or more of the elements depicted in FIGS. 1 through 3 can also be implemented in a more separated or integrated manner, or even removed or rendered as inoperable in certain cases, as is useful in accordance with a particular application.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Additionally, the term "or" as used herein is generally intended to mean "and/or" unless otherwise indicated. Combinations of components or steps will also be considered as being noted, where terminology is foreseen as rendering the ability to separate or combine is unclear.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising:
   storing, at a server, a set of tokens for a remote user;
   receiving, by the server, a request to access a server-side rendering system from the remote user;
   monitoring, by the server, an operation of the server-side rendering system in response to the request, the operation comprising monitoring one of CPU utilization, GPU utilization, and bandwidth utilization of the server-side rendering system in aggregate and with respect to the remote user's session;
   adjusting, by the server, an amount of the set of tokens utilized based on monitoring the CPU, GPU and bandwidth utilization; and
   transmitting, by the server, a rendered frame of image data generated by the server-side rendering system while the amount of the set of tokens is greater than zero.

2. The method of claim 1, wherein storing the set of tokens for a remote user comprises storing a number of tokens as a parameter value in a corresponding field of a user account record.

3. The method of claim 1, wherein storing the set of tokens for a remote user comprises storing a digital object digitally signed using a cryptographic function, the digital object including a message storing one or more of a user account identifier, an identifier of a token issuing entity, a number of tokens, time stamps, and application types for which the token can be used.

4. The method of claim 1, wherein monitoring the operation of the server-side rendering system in response to the request comprises monitoring one or more of central processing unit utilization, graphics processing unit utilization or bandwidth utilization with respect to a user session.

5. The method of claim 1, further comprising:
   determining that the set of tokens has expired when the amount of the set of tokens is equal or less than zero; and
   halting the operating of the server-side rendering system when the set of tokens has expired.

6. The method of claim 1, further comprising receiving a parameter adjusting an expiration rate of the set of tokens, the parameter selected from the group consisting of an image resolution value, a sample number, a color depth, and a bit depth.

7. The method of claim 1, further comprising receiving a parameter adjusting an expiration rate of the set of tokens, the parameter comprising an overall budget of the user.

8. A non-transitory computer-readable storage medium for tangibly storing computer program instructions capable of being executed by a computer processor, the computer program instructions defining steps of:
   storing, at a server, a set of tokens for a remote user;
   receiving, by the server, a request to access a server-side rendering system from the remote user;
   monitoring, by the server, an operation of the server-side rendering system in response to the request, the operation comprising monitoring one of CPU utilization, GPU utilization, and bandwidth utilization of the server-side rendering system in aggregate and with respect to the remote user's session;
   adjusting, by the server, an amount of the set of tokens utilized based on monitoring the CPU, GPU and bandwidth utilization; and
   transmitting, by the server, a rendered frame of image data generated by the server-side rendering system while the amount of the set of tokens is greater than zero.

9. The non-transitory computer-readable storage medium of claim 8, wherein storing the set of tokens for a remote user comprises storing a number of tokens as a parameter value in a corresponding field of a user account record.

10. The non-transitory computer-readable storage medium of claim 8, wherein storing the set of tokens for a remote user comprises storing a digital object digitally signed using a cryptographic function, the digital object including a message storing one or more of a user account identifier, an identifier of a token issuing entity, a number of tokens, time stamps, and application types for which the token can be used.

11. The non-transitory computer-readable storage medium of claim 8, wherein monitoring the operation of the server-side rendering system in response to the request comprises monitoring one or more of central processing unit utilization, graphics processing unit utilization or bandwidth utilization with respect to a user session.

12. The non-transitory computer-readable storage medium of claim 8, further comprising:
   determining that the set of tokens has expired when the amount of the set of tokens is equal or less than zero; and
   halting the operating of the server-side rendering system when the set of tokens has expired.

13. The non-transitory computer-readable storage medium of claim 8, further comprising receiving a parameter adjusting an expiration rate of the set of tokens, the parameter selected from the group consisting of an image resolution value, a sample number, a color depth, and a bit depth.

14. The non-transitory computer-readable storage medium of claim 8, further comprising receiving a parameter adjusting an expiration rate of the set of tokens, the parameter comprising an overall budget of the user.

15. A device comprising:
a processor configured to:
store a set of tokens for a remote user;
receive a request to access a server-side rendering system from the remote user;
monitor an operation of the server-side rendering system in response to the request, the operation comprising monitoring one of CPU utilization, GPU utilization, and bandwidth utilization of the server-side rendering system in aggregate and with respect to the remote user's session;
adjust an amount of the set of tokens utilized based on monitoring the CPU, GPU and bandwidth utilization; and
transmit a rendered frame of image data generated by the server-side rendering system while the amount of the set of tokens is greater than zero.

16. The device of claim 15, wherein storing the set of tokens for a remote user comprises storing a number of tokens as a parameter value in a corresponding field of a user account record.

17. The device of claim 15, wherein storing the set of tokens for a remote user comprises storing a digital object digitally signed using a cryptographic function, the digital object including a message storing one or more of a user account identifier, an identifier of a token issuing entity, a number of tokens, time stamps, and application types for which the token can be used.

18. The device of claim 15, wherein monitoring the operation of the server-side rendering system in response to the request comprises monitoring one or more of central processing unit utilization, graphics processing unit utilization or bandwidth utilization with respect to a user session.

19. The device of claim 15, the processor further configured to receive a parameter adjusting an expiration rate of the set of tokens, the parameter selected from the group consisting of an image resolution value, a sample number, a color depth, and a bit depth.

20. The device of claim 15, the processor further configured to receive a parameter adjusting an expiration rate of the set of tokens, the parameter comprising an overall budget of the user.

* * * * *